(12) United States Patent
Billard et al.

(10) Patent No.: US 11,603,288 B2
(45) Date of Patent: Mar. 14, 2023

(54) MAGNET ASSEMBLIES OF ELECTROMECHANICAL ACTUATORS FOR ELEVATOR SYSTEMS

(71) Applicant: Otis Elevator Company, Farmington, CT (US)

(72) Inventors: Justin Billard, Amston, CT (US); Antonio Martins, Vernon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 376 days.

(21) Appl. No.: 16/915,195

(22) Filed: Jun. 29, 2020

(65) Prior Publication Data

US 2021/0403287 A1    Dec. 30, 2021

(51) Int. Cl.
*B66B 5/18*      (2006.01)
*F16D 65/092*    (2006.01)
(Continued)

(52) U.S. Cl.
CPC .............. *B66B 5/18* (2013.01); *F16D 65/092* (2013.01); *F16D 65/183* (2013.01);
(Continued)

(58) Field of Classification Search
CPC . B66B 5/18; B66B 5/22; F16D 65/092; F16D 65/183; F16D 69/027;
(Continued)

(56) References Cited

U.S. PATENT DOCUMENTS 5,791,442 A * 8/1998 Arnold ...................... H01F 5/00
                                                               188/164
7,299,898 B2 * 11/2007 Husmann .................. B66B 5/20
                                                               187/373
(Continued)

FOREIGN PATENT DOCUMENTS

CN           1217289 A      5/1999
CN       110775769 A      2/2020
(Continued)

OTHER PUBLICATIONS

European Search Report for European Application No. 20215682.4, dated Sep. 28, 2021, 6 pages.
(Continued)

*Primary Examiner* — Thomas W Irvin
(74) *Attorney, Agent, or Firm* — Cantor Colburn LLP

(57) ABSTRACT

Magnet assemblies for electromechanical assemblies of elevator systems are described. The magnet assemblies include a magnet and first and second block assemblies arranged on opposite sides of the magnet. In some configurations, the block assemblies each include a respective friction engagement surface and are formed of layers of sheet metal, with a portion of the layers having blade teeth that form a friction engagement surface for engagement with a guide rail. In some configurations, each of the block assemblies are formed from powder metal sintering and include a monolithic tooth configuration configured to form a friction engagement surface for engagement with a guide rail. In some configurations each of the block assemblies (Continued)

includes an abrasive coating configured to form a friction engagement surface for engagement with a guide rail.

20 Claims, 14 Drawing Sheets

(51) Int. Cl.
*F16D 65/18* (2006.01)
*F16D 69/02* (2006.01)
*F16D 121/20* (2012.01)
*F16D 121/22* (2012.01)

(52) U.S. Cl.
CPC ........ *F16D 69/027* (2013.01); *F16D 2121/20* (2013.01); *F16D 2121/22* (2013.01); *F16D 2200/0043* (2013.01); *F16D 2200/0052* (2013.01)

(58) Field of Classification Search
CPC ............. F16D 2121/20; F16D 2121/22; F16D 2200/0043; F16D 2200/0052
See application file for complete search history.

(56) References Cited

U.S. PATENT DOCUMENTS

| | | | |
|---|---|---|---|
| 9,835,216 B2 * | 12/2017 | El-Wardany | B05D 1/12 |
| 9,981,827 B2 * | 5/2018 | Osmanbasic | F16D 63/008 |
| 10,309,475 B2 * | 6/2019 | Duvall | F16D 69/0408 |
| 10,584,014 B2 * | 3/2020 | Fauconnet | B66B 5/22 |
| 10,822,200 B2 | 11/2020 | Dube | |
| 11,053,097 B2 | 7/2021 | Khzouz et al. | |
| 11,066,274 B2 * | 7/2021 | Khzouz | B66B 5/18 |
| 11,267,677 B2 * | 3/2022 | Ruhnke | B66B 5/18 |
| 2011/0293849 A1 * | 12/2011 | Lembach | F16D 65/127 |
| | | | 148/284 |
| 2013/0043097 A1 * | 2/2013 | Widmer | B66B 5/02 |
| | | | 187/288 |
| 2014/0008157 A1 * | 1/2014 | Terry | B66B 1/365 |
| | | | 187/359 |
| 2014/0224594 A1 * | 8/2014 | Billard | B66B 5/18 |
| | | | 187/359 |
| 2015/0259175 A1 * | 9/2015 | West | F16D 63/008 |
| | | | 187/359 |
| 2016/0236904 A1 * | 8/2016 | Witczak | B66B 5/22 |
| 2017/0001835 A1 * | 1/2017 | Hu | F16D 65/16 |
| 2017/0066627 A1 * | 3/2017 | Hu | B66B 5/18 |
| 2017/0107078 A1 * | 4/2017 | Hu | B66B 5/04 |
| 2017/0114847 A1 * | 4/2017 | Ferrari | F16D 69/027 |
| 2017/0129741 A1 | 5/2017 | Hu et al. | |
| 2017/0283216 A1 * | 10/2017 | Marvin | B66B 5/044 |
| 2017/0283217 A1 * | 10/2017 | Marvin | B66B 5/0031 |
| 2018/0222718 A1 * | 8/2018 | Khzouz | B66B 5/18 |
| 2018/0327224 A1 | 11/2018 | Billard et al. | |
| 2019/0177124 A1 * | 6/2019 | Billard | B66B 7/046 |
| 2019/0186573 A1 * | 6/2019 | Manes | B66B 5/22 |
| 2019/0248627 A1 | 8/2019 | Munoz | |
| 2019/0352127 A1 * | 11/2019 | Billard | B66B 5/18 |
| 2020/0031621 A1 | 1/2020 | Khzouz et al. | |
| 2020/0071129 A1 * | 3/2020 | Ruhnke | B66B 5/18 |
| 2021/0253396 A1 * | 8/2021 | Billard | B66B 9/00 |
| 2021/0375517 A1 * | 12/2021 | Billard | H01F 7/02 |
| 2021/0403278 A1 * | 12/2021 | Billard | B66B 5/18 |

FOREIGN PATENT DOCUMENTS

| | | |
|---|---|---|
| CN | 110872041 A | 3/2020 |
| CN | 111039124 A | 4/2020 |
| EP | 1547958 A1 | 6/2005 |
| JP | 2012046349 A | 3/2012 |

OTHER PUBLICATIONS

China Office Action for China Application No. 202011386974.X; dated Nov. 3, 2022, 6 pages.

* cited by examiner

MAGNET ASSEMBLIES OF ELECTROMECHANICAL ACTUATORS FOR ELEVATOR SYSTEMS

BACKGROUND

Embodiments described herein relate to elevator brake assemblies and, more specifically, to elevator brakes with electromagnetic assemblies having permanent magnet assemblies that are configured to engage with the electromagnet assemblies.

Elevator systems may be configured with an electronic safety actuator as an alternative to the typical, centrifugal governor. In such electronic safety actuators, a bi-stable magnetic actuator is used to engage the safeties, and thus enable stopping of an elevator car. The safety actuators include magnet assemblies that are configured to provide a friction interface to generate a braking force when activated and engaged with a guide rail of an elevator system. It may be advantageous to provide improved magnet assemblies that may have increased life, lower costs, and/or high braking force.

BRIEF SUMMARY

In accordance with some embodiments, magnet assemblies of electromechanical assemblies for elevator systems are provided. The magnet assemblies include a magnet, a first block assembly arranged on a first side of the magnet, and a second block assembly arranged on a second side of the magnet opposite the first block assembly. Each of the first block assembly and the second block assembly each include a respective friction engagement surface and each of the first block assembly and the second block assembly are formed of layers of sheet metal, and a portion of the layers of sheet metal include blade teeth that form the friction engagement surface for engagement with a guide rail.

In addition to one or more of the features described above, or as an alternative, further embodiments of the magnet assemblies may include that the layers of sheet metal include a first group of sheet metal layers that are generally rectangular and a second group of sheet metal layers that include teeth that form the blade teeth.

In addition to one or more of the features described above, or as an alternative, further embodiments of the magnet assemblies may include that the layers of sheet metal and the magnet include at least one aperture for receiving at least one respective fastener to join the layers of sheet metal and the magnet together.

In addition to one or more of the features described above, or as an alternative, further embodiments of the magnet assemblies may include that the layers of sheet metal are saw blade sheet metal stock.

In addition to one or more of the features described above, or as an alternative, further embodiments of the magnet assemblies may include an encapsulating body that houses the magnet, the first block assembly, and the second block assembly.

In addition to one or more of the features described above, or as an alternative, further embodiments of the magnet assemblies may include that the encapsulating body is formed of a non-magnetic material.

In addition to one or more of the features described above, or as an alternative, further embodiments of the magnet assemblies may include that the layers of sheet metal include alternating angled teeth that form the blade teeth.

In addition to one or more of the features described above, or as an alternative, further embodiments of the magnet assemblies may include that the magnet, the first block assembly, and the second block assembly are configured to engage with the guide rail and act upon a connecting rod to actuate a safety brake.

In addition to one or more of the features described above, or as an alternative, further embodiments of the magnet assemblies may include that the magnet, the first block assembly, and the second block assembly are configured to travel within a track of the electromechanical assembly.

In accordance with some embodiments, magnet assemblies of electromechanical assemblies for elevator systems are provided. The magnet assemblies includes a magnet, and a first block assembly arranged on a first side of the magnet, and a second block assembly arranged on a second side of the magnet opposite the first block assembly. Each of the first block assembly and the second block assembly are formed from powder metal sintering and include a monolithic tooth configuration configured to form a friction engagement surface for engagement with a guide rail.

In addition to one or more of the features described above, or as an alternative, further embodiments of the magnet assemblies may include an encapsulating body that houses the magnet, the first block assembly, and the second block assembly.

In addition to one or more of the features described above, or as an alternative, further embodiments of the magnet assemblies may include that the encapsulating body is formed of a non-magnetic material.

In addition to one or more of the features described above, or as an alternative, further embodiments of the magnet assemblies may include that the magnet, the first block assembly, and the second block assembly are configured to engage with the guide rail and act upon a connecting rod to actuate a safety brake.

In addition to one or more of the features described above, or as an alternative, further embodiments of the magnet assemblies may include that the magnet, the first block assembly, and the second block assembly are configured to travel within a track of the electromechanical assembly.

In accordance with some embodiments, magnet assemblies of electromechanical assemblies for elevator systems are provided. The magnet assemblies includes a magnet, and a first block assembly arranged on a first side of the magnet, and a second block assembly arranged on a second side of the magnet opposite the first block assembly. Each of the first block assembly and the second block assembly include an abrasive coating configured to form a friction engagement surface for engagement with a guide rail.

In addition to one or more of the features described above, or as an alternative, further embodiments of the magnet assemblies may include that the abrasive coating comprises at least one of Cubic Boron Nitride ("CBN") and industrial diamond.

In addition to one or more of the features described above, or as an alternative, further embodiments of the magnet assemblies may include an encapsulating body that houses the magnet, the first block assembly, and the second block assembly.

In addition to one or more of the features described above, or as an alternative, further embodiments of the magnet assemblies may include that the encapsulating body is formed of a non-magnetic material.

In addition to one or more of the features described above, or as an alternative, further embodiments of the magnet assemblies may include that the magnet, the first block assembly, and the second block assembly are configured to engage with the guide rail and act upon a connecting rod to actuate a safety brake.

In addition to one or more of the features described above, or as an alternative, further embodiments of the magnet assemblies may include that the magnet, the first block assembly, and the second block assembly are configured to travel within a track of the electromechanical assembly.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
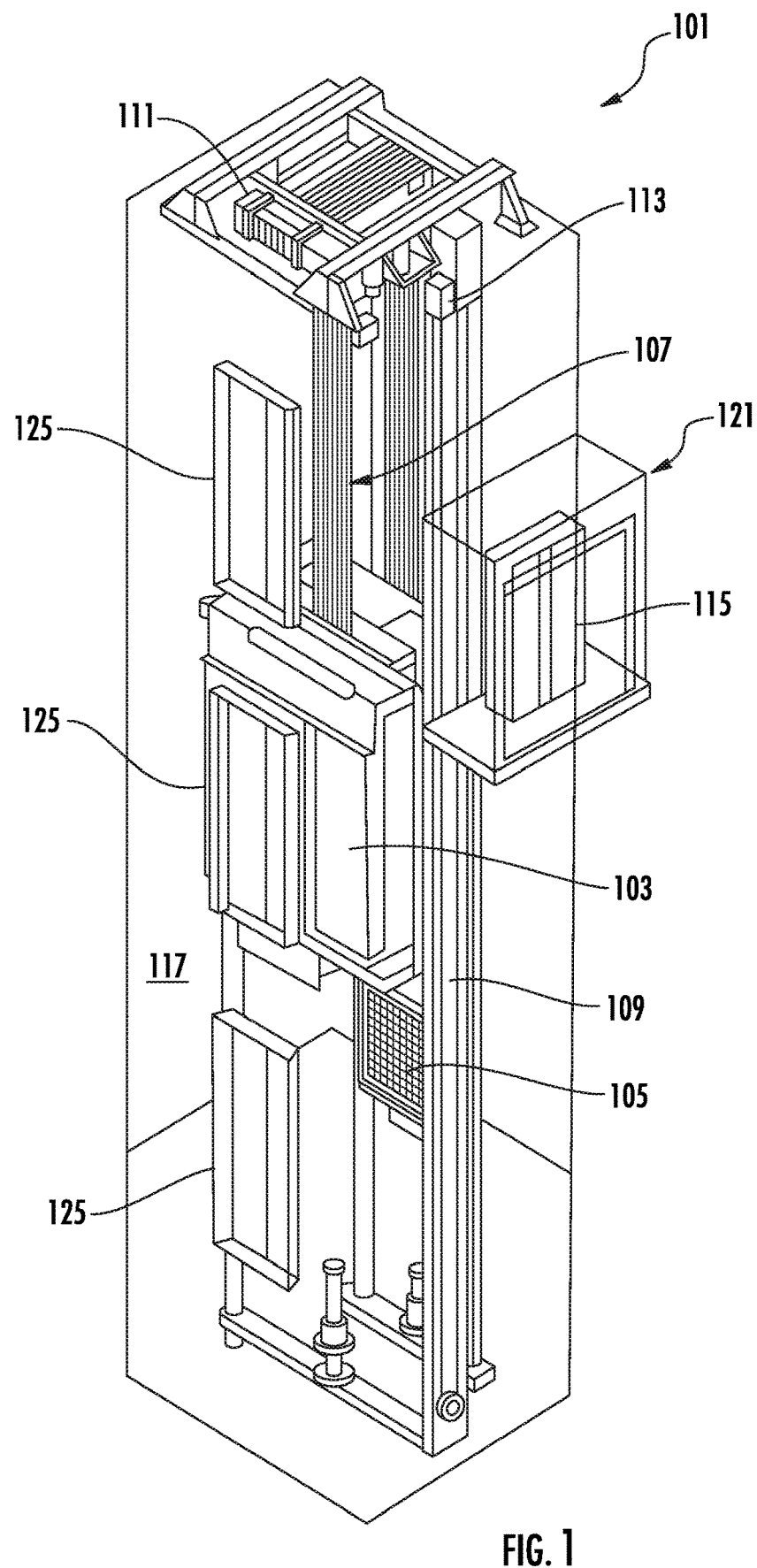
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter-weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
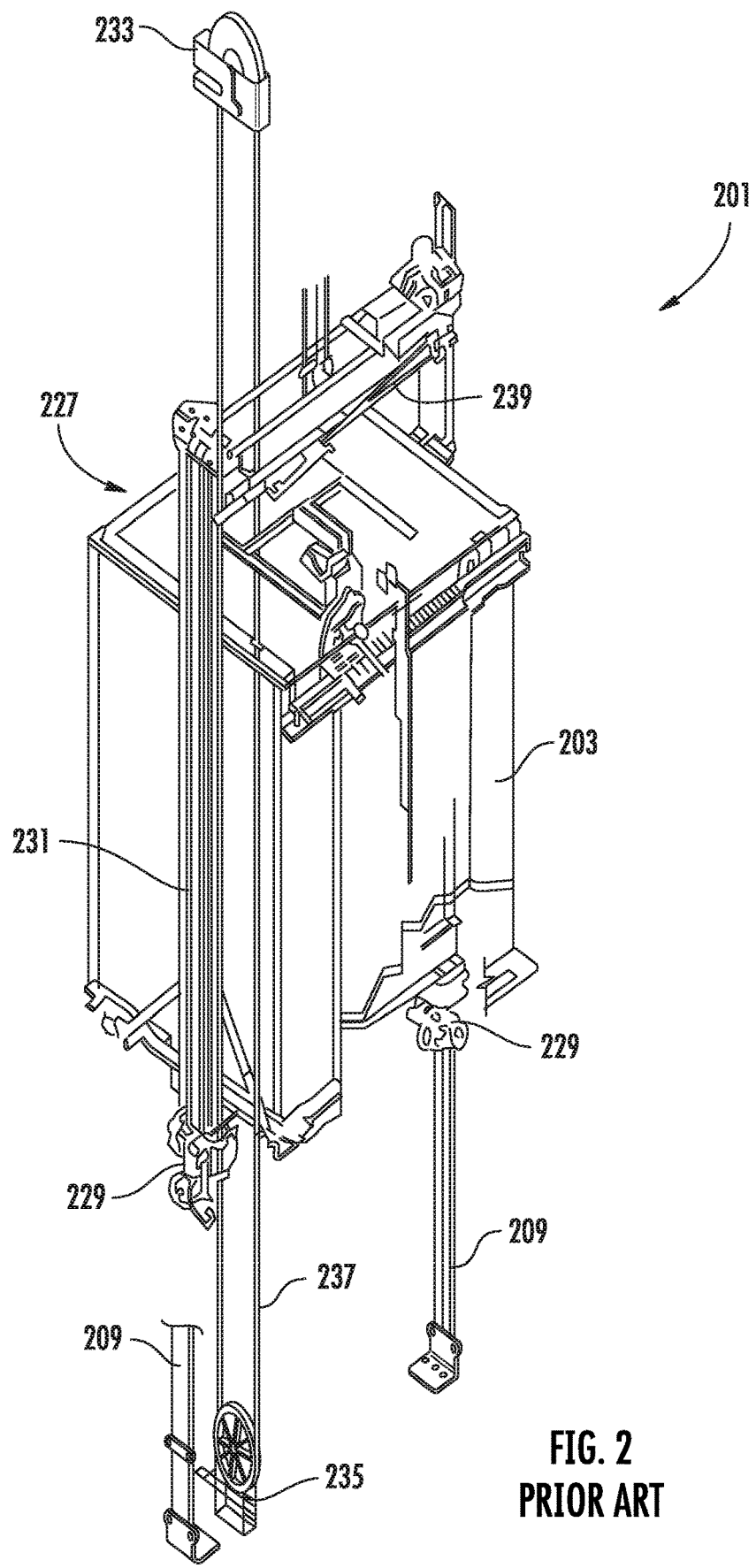
FIG. 2 is a prior art arrangement of an overspeed safety system for elevators.

Turning to FIG. 2, a schematic illustration of a prior elevator car overspeed safety system 227 of an elevator system 201 is shown. The elevator system 201 includes an elevator car 203 that is movable within an elevator shaft along guide rails 209. In this illustrative embodiment, the overspeed safety system 227 includes a pair of braking elements 229 that are engageable with the guide rails 209. The braking elements 229 are actuated, in part, by operation of lift rods 231. The triggering of the braking elements 229 is achieved through a governor 233, typically located at the top of the elevator shaft, which includes a tension device 235 located within the pit of the elevator shaft with a cable 237 operably connecting the governor 233 and the tension device 235. When an overspeed event is detected by the governor, the overspeed safety system 227 is triggered, and a linkage 239 is operated to actuate a combination of lift rods 231 simultaneously to cause actuation (e.g., self-engagement) of the braking elements 229 (e.g., safety wedges) that engage with the guide rail and cause a smooth and even stopping or braking force to stop the travel of the elevator car. As used herein the term "overspeed event" refers to an event during which a speed, velocity, or acceleration of an elevator car exceeds a predetermined threshold of the respective state of motion, and is not intended to be limited to constant speed, but rather also includes rates of change (e.g., acceleration) and also direction of travel of motion the elevator car (e.g., velocity). The linkage 239, as shown, is located on the top of the elevator car 203 and ensures simultaneous operation of the braking elements 229. However, in other configurations, the linkage may be located below a platform (or bottom) of the elevator car. As shown, various components are located above and/or below the elevator car 203, and thus pit space and overhead space within the elevator shaft must be provided to permit operation of the elevator system 201.

Figure 3A:
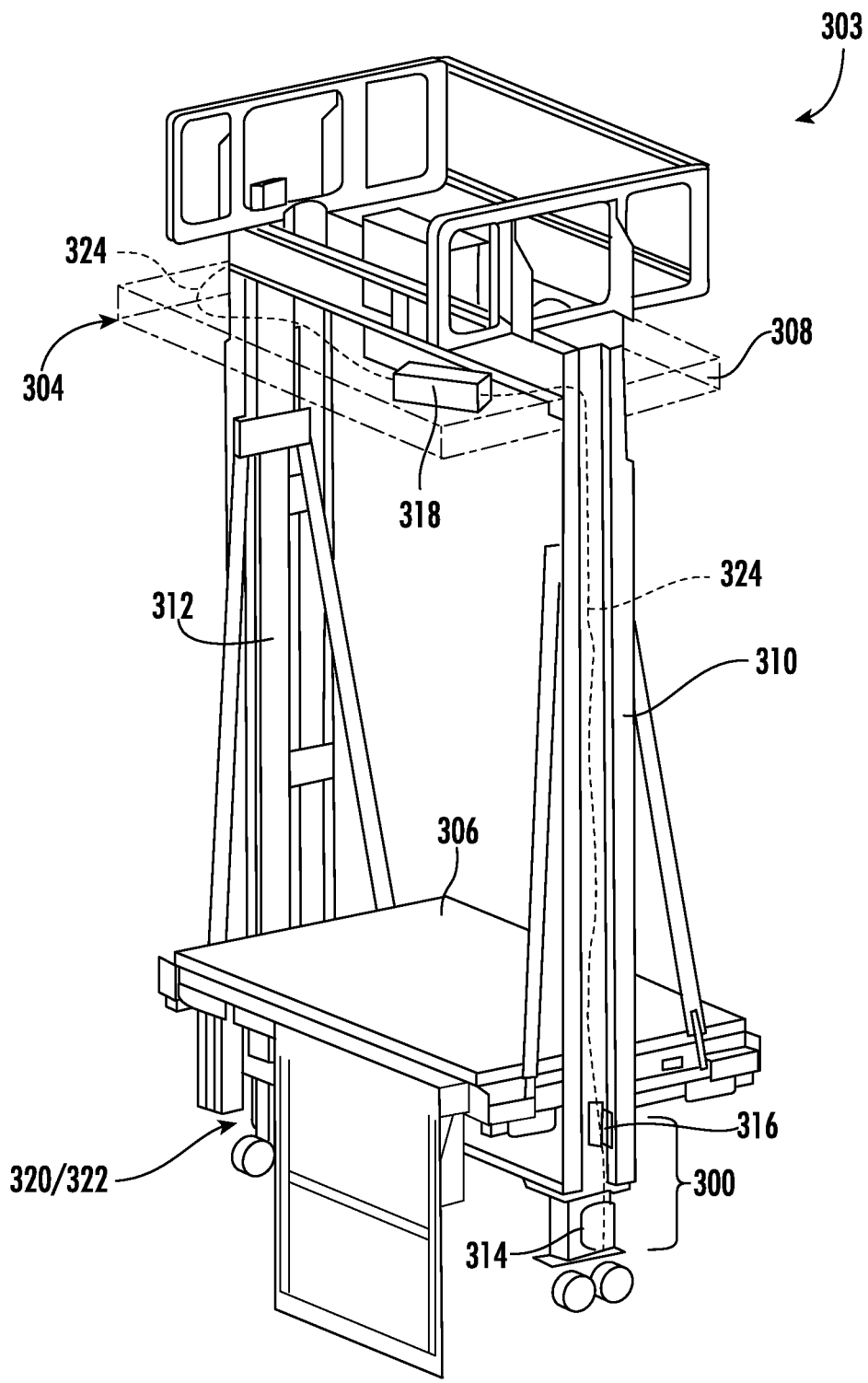
FIG. 3A is an isometric illustration of an elevator car frame having an overspeed safety system in accordance with an embodiment of the present disclosure.
Figure 3B:
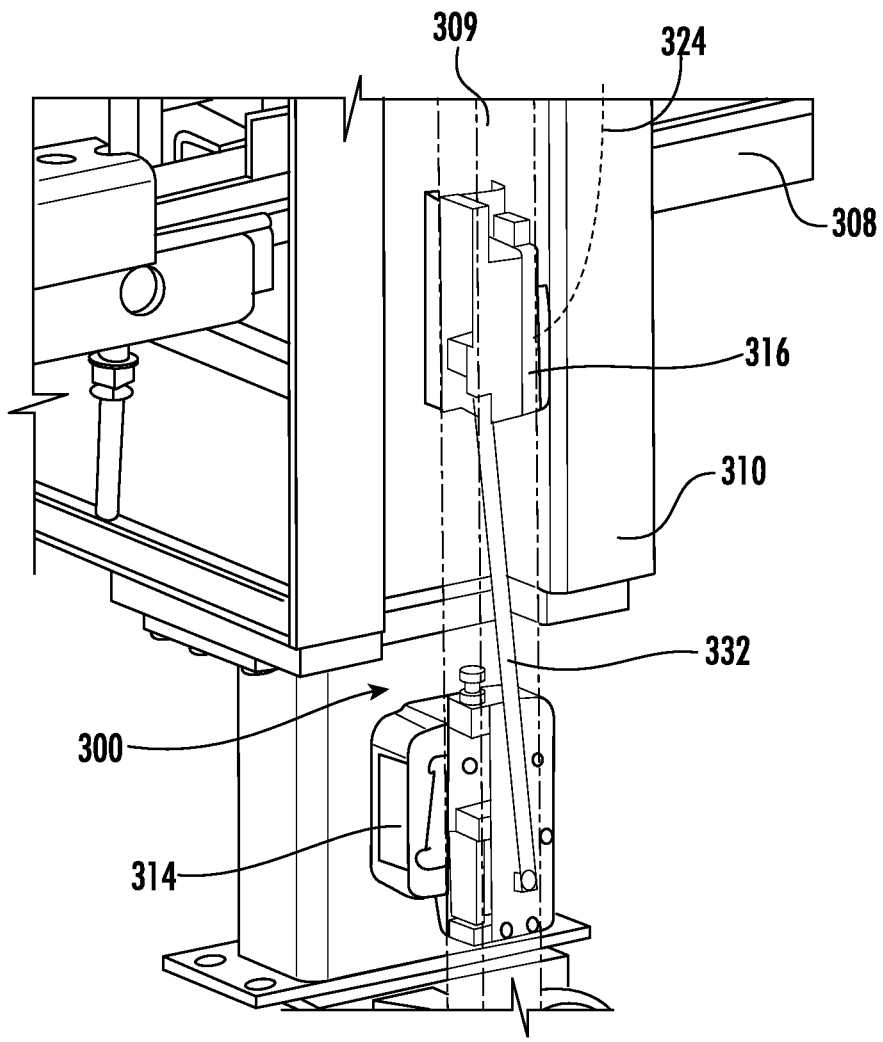
FIG. 3B is an enlarged illustrative view of a portion of the overspeed safety system of FIG. 3A.
Figure 3C:
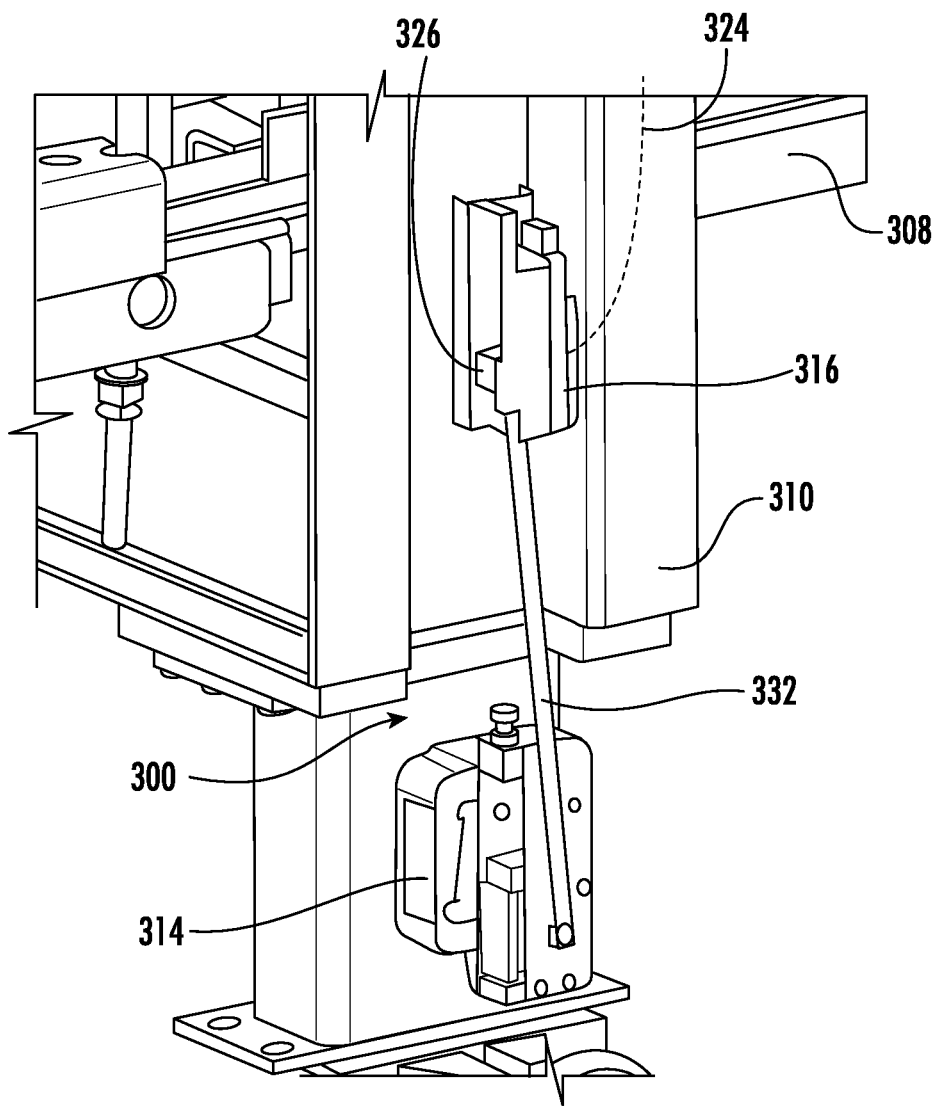
FIG. 3C is the same view as FIG. 3B, but with a guide rail removed for clarity.

Turning now to FIGS. 3A-3C, schematic illustrations of an elevator car 303 having an overspeed safety system 300 in accordance with an embodiment of the present disclosure are shown. FIG. 3A is an isometric illustration of an elevator car frame 304 with the overspeed safety system 300 installed thereto. FIG. 3B is an enlarged illustration of a portion of the overspeed safety system 300 showing a relationship with a guide rail. FIG. 3C is a schematic similar to FIG. 3B, but with the guide rail removed for clarity of illustration.

The car frame 304 includes a platform 306, a ceiling 308, a first car structural member 310, and a second car structural member 312. The car frame 304 defines a frame for supporting various panels and other components that define the elevator car for passenger or other use (i.e., define a cab of the elevator), although such panels and other components are omitted for clarity of illustration. The elevator car 303 is moveable along guide rails 309 (shown in FIG. 3B), similar to that shown and described above. The overspeed safety system 300 provides a safety braking system that can stop the travel of the elevator car 303 during an overspeed event.

The overspeed safety system 300 includes a first safety brake 314, a first electromechanical actuator 316, and a controller or control system 318 operably connected to the first electromechanical actuator 316. The first safety brake 314 and the first electromechanical actuator 316 are arranged along the first car structural member 310. A second safety brake 320 and a second electromechanical actuator 322 are arranged along the second car structural member 312. The control system 318 is also operably connected to the second electromechanical actuator 322. The connection between the control system 318 and the electromechanical actuators 316, 322 may be provided by a communication line 324. The communication line 324 may be wired or wireless, or a combination thereof (e.g., for redundancy). The communication line 324 may be an electrical wire to supply electrical power from the control system 318 and an electromagnet of the first electromechanical actuator 316. It will be appreciated that in alternative configurations, the communication may be a wireless communication system, both for data/information and/or wireless power transfer. It will be appreciated that the overspeed safety system 300, in accordance with embodiments, can include any number of safety brakes, such as one, two, three, or more.

As shown, the control system 318 is located on the top or ceiling 308 of the car frame 304. However, such position is not to be limiting, and the control system 318 may be located anywhere within the elevator system (e.g., on or in the elevator car, within a controller room, etc.). The control system 318 may comprise electronics and printed circuit boards for processing (e.g., processor, memory, communication elements, electrical buss, etc.). Thus, the control system 318 may have a very low profile and may be installed within ceiling panels, wall panels, or even within a car operating panel of the elevator car 303. In other configurations, the control system 318 may be integrated into various of the components of the overspeed safety system 300 (e.g., within or part of the electromechanical actuator 316).

The overspeed safety system 300 is an electromechanical system that eliminates the need for a linkage or linking element installed at the top or bottom of the elevator car. The control system 318 may include, for example, a printed circuit board with multiple inputs and outputs. In some embodiments, the control system 318 may include circuitry for a system for control, protection, and/or monitoring based on one or more programmable electronic devices (e.g., power supplies, sensors, and other input devices, data highways and other communication paths, and actuators and other output devices, etc.). The control system 318 may further include various components to enable control in the event of a power outage (e.g., capacitor/battery, etc.). The control system 318 may also include an accelerometer or other component/device to determine a speed of an elevator car (e.g., optical sensors, laser range finders, etc.). In such embodiments, the control system 318 is mounted to the elevator car, as shown in the illustrative embodiments herein.

The control system 318, in some embodiments, may be connected to and/or in communication with a car positioning system, an accelerometer mounted to the car (i.e., a second or separate accelerometer), and/or to the elevator controller. Accordingly, the control system 318 may obtain movement information (e.g., speed, direction, acceleration) related to movement of the elevator car along an elevator shaft. The control system 318 may operate independently of other systems, other than potentially receiving movement information, to provide a safety feature to prevent overspeed events.

The control system 318 may process the movement information provided by a car positioning system to determine if an elevator car is traveling at a speed in excess of a threshold speed. If the threshold is exceeded, the control system 318 will trigger the electromechanical actuators and the safety brakes. The control system 318 will also provide feedback to the elevator control system about the status of the overspeed safety system 300 (e.g., normal operational position/triggered position). It will be appreciated that although referred to as an "overspeed" system, the systems may be configured to determine if an elevator car is accelerating at a rate in excess of a threshold acceleration, and the term "overspeed" is not to be limiting to merely a constant rate of motion.

Thus, the overspeed safety system 300 of the present disclosure enables electrical and electromechanical safety braking in the event of overspeed events. The electrical aspects of the present disclosure enable the elimination of the physical/mechanical linkages that have traditionally been employed in overspeed safety systems. That is, the electrical connections allow for simultaneous triggering of two separate safety brakes through electrical signals, rather than relying upon mechanical connections and other components such as wheels, ropes, etc.

With reference to FIG. 3C, details of parts of the overspeed safety system 300 are shown. The first electromechanical actuator 316 is mounted to the first car structural member 310 using one or more fasteners. The first electromechanical actuator 316 includes a magnet assembly 326 that is configured to magnetically engage with the guide rail 309. The first electromechanical actuator 316 is operably connected to the control system 318 by the communication line 324. The control system 318 can transmit an actuation signal to the first electromechanical actuator 316 (and the second electromechanical actuator 322) to perform an actuation operation when an overspeed event is detected. As used herein the term "overspeed event" refers to an event during which a speed, velocity, or acceleration of an elevator car exceeds a predetermined threshold of the respective state of motion, and is not intended to be limited to constant speed, but rather also includes rates of change (e.g., acceleration) and also direction of travel of motion the elevator car (e.g., velocity). The first electromechanical actuator 316 will actuate a connecting rod 332, by means of the magnet assembly 326 that is operably connected to the first safety brake 314. When the connecting rod 332 is actuated, the first safety brake 314 will actuate to engage with the guide rail 309, e.g., using a safety brake element 334, such as a safety roller or wedge. In some embodiments, the two-part illustrated configuration may be integrated into a single unit, thus potentially eliminating the connecting rod.

In accordance with embodiments of the present disclosure, portions of the overspeed safety system are bolted or other attachment means are used to fix the components to the upright. That is, the overspeed safety system in accordance with some embodiments of the present disclosure does not float within the upright, and it is not guided by the rail. For example, in normal operation, the overspeed safety system has no contact with the guide rail. Therefore, as the elevator car floats in the front-to-back direction, the components of the overspeed safety system (e.g., a housing) move with the elevator car and the magnet assembly is sometimes closer to the blade of the guide rail and sometimes farther from the guide rail. One advantage of such approach, in accordance with embodiments of the present disclosure, is that guiding elements are not needed, and therefore, the risk of noise from the guiding elements rubbing along the rail is eliminated. Similarly, for example, there is no risk of these guiding elements wearing because they are not included in the design. However, because the magnet assembly floats with the elevator car, and thus may be relatively far from the guide rail, triggering of the system (e.g., moving the magnet assembly from an electromagnet assembly of the system to engage with the guide rail) may be more difficult. Further, such configuration may increase the difficulty of resetting the system after activation (e.g., removing the magnet assembly from the guide rail and returning it to the electromagnet assembly).

To overcome these considerations, as described herein and in accordance with some embodiments of the present disclosure, biasing element (e.g., springs) are included in the overspeed safety system. One end of the biasing element is fixed against a housing of the overspeed safety system and the other end acts to push the electromagnet assembly into the housing. During resetting, the electromagnet assembly overcomes the force of the biasing elements, moves toward the guide rail and the magnet assembly that is magnetically engaged to the guide rail. When the electromagnet assembly contacts the back surface of the magnet assembly or becomes imminently close to it, the magnet assembly releases from the guide rail and magnetically engages with the electromagnet assembly (e.g., the magnetic force applied by the electromagnetic assembly overcomes the magnetic attraction between the magnet assembly and the guide rail). The biasing elements then act to move the electromagnet assembly and the magnet assembly back into the housing. The magnet assemblies are subject to repeated engagement with a guide rail to generate a friction braking force. Embodiments of the present disclosure are directed to robust, low cost, and/or high reliability magnet assemblies for use in electromagnet actuators of elevator systems.

Figure 4A:
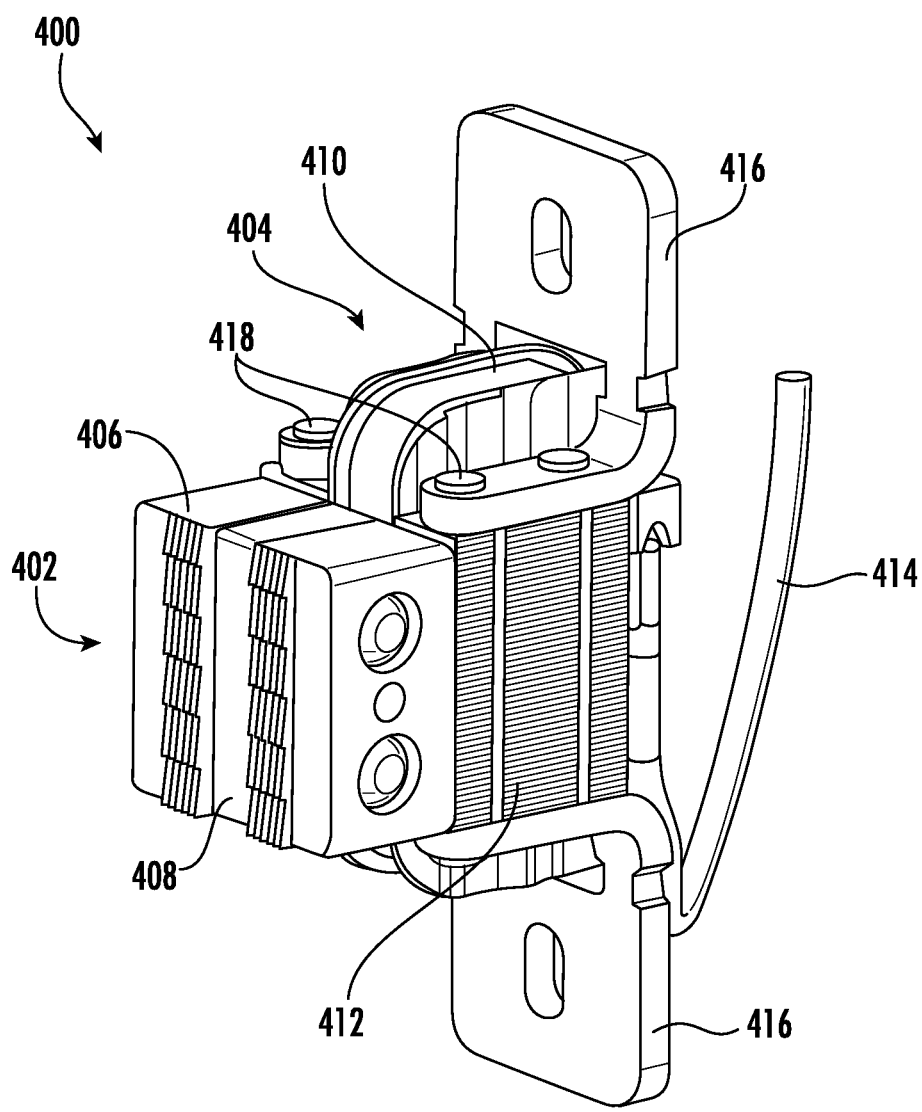
FIG. 4A is a schematic illustration of a portion of an electromagnet actuator that may incorporate embodiments of the present disclosure.
Figure 4B:
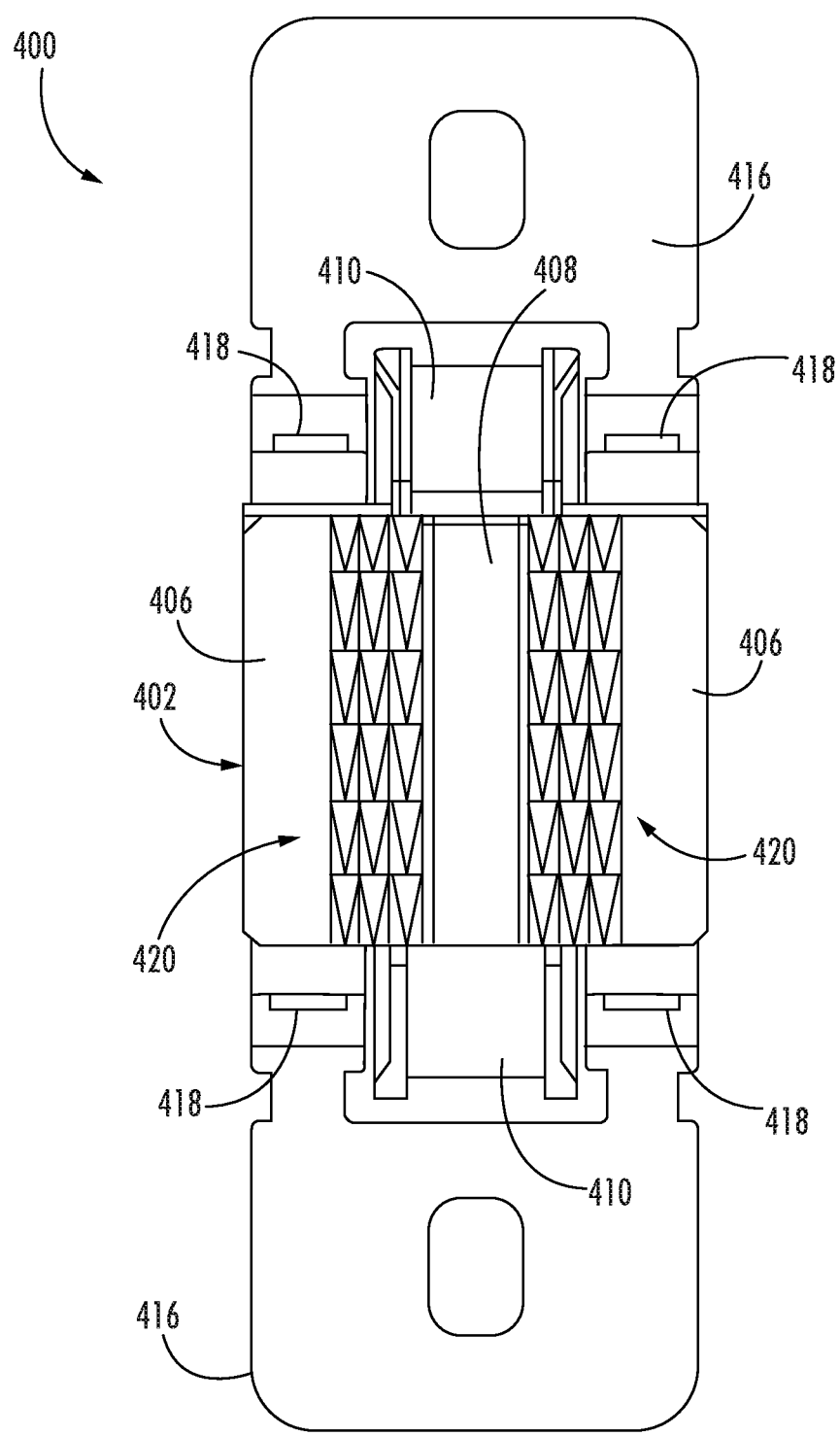
FIG. 4B is a front elevation view of the assembly shown in FIG. 4A.

Turning now to FIGS. 4A-4B, schematic illustrations of an electromagnet actuator 400 that may incorporate embodiments of the present disclosure is shown. The electromagnet actuator 400 may be a part of an electromechanical actuator, as shown and described above. The electromagnet actuator 400, as illustratively shown in this example embodiment, includes a magnet assembly 402 that is operably (and magnetically) connectable to an electromagnet assembly 404. The magnet assembly 402 includes an optional toothed block 406 and a magnet 408 (e.g., permanent magnet), and may be connected to a connecting rod (not shown), as will be appreciated by those of skill in the art, or directly connected to a safety brake in a single unit. The toothed block 406 provides for a contact structure or surface for engaging with a guide rail of an elevator system when the electromagnet actuator 400 is activated to provide a stopping or braking force. The teeth of the toothed block 406 are configured to grip into and frictionally engage with the guide rail such that a braking force is generated.

In this illustrative non-limiting configuration, the electromagnet assembly 404 includes a coil 410 arranged around a core 412 (e.g., formed from steel or steel plates). One or more lead wires 414 are electrically connected to the coil 410 to supply electricity thereto and thus generate a magnetic field by means of the coil 410 and the core 412. The coil 410 and the core 412 are located within a housing or other part of an elevator car (e.g., a frame) and movably mounted thereto (e.g., along springs or other biasing elements). The magnet 408 of the magnet assembly 402 is releasable from the electromagnet assembly 404 during a braking operation and thus cause a connecting rod to engage a safety brake of an elevator car. It will be appreciated that other configurations of electromagnetic assemblies may be employed without departing from the scope of the present disclosure. As shown, the coil 410 and the core 412 are mounted to a flange support 416 by one or more fasteners 418 (e.g., bolts). The biasing elements are configured to apply a biasing force against the flange support 416, as will be appreciated by those of skill in the art.

FIG. 4B illustrates a front elevation view, illustrating details of the magnet assembly 402. In particular, FIG. 4B illustrates the arrangement of teeth 420 of the toothed blocks 406. As shown, the teeth 420 are arranged in columns, and in particular, three columns of teeth 420 are provided on each toothed block 406. The teeth 420 are formed through a machining process which requires hardening of the material of the toothed blocks 406 after the machining and formation of the teeth 420. The teeth 420 are configured to provide a gripping or friction engagement with a guide rail during a braking operation. The teeth 420 will contact the material of the guide rail to generate a frictional braking force.

The illustration of FIG. 4B may be considered representative of a configuration of a toothed block. This configuration illustrates the inclusion of the three columns of teeth 420 which may be intentionally designed in view of operational, functional, and manufacturing considerations. The two primary considerations for formation and arrangement of the teeth are (i) maximizing the amount of tooth material (e.g., steel) in proximity to a guide rail so that a magnetic attraction of the magnetic to the guide rail can be maximized and (ii) minimizing the amount of tooth material that is actually in contact with the guide rail so that the pressures applied by the tips of the teeth can be high and the teeth can "cut into" the guide rail. That is, there is a balance between material frictional contact and magnetic contact between the magnet assembly and the guide rail to ensure a desired braking or stopping force to be generated. It was determined that when employing a machined magnet assembly, having three columns of teeth provided a preferred configuration and balance between the magnetic attraction and the frictional contract forces, which are inversely related.

Figure 5B:
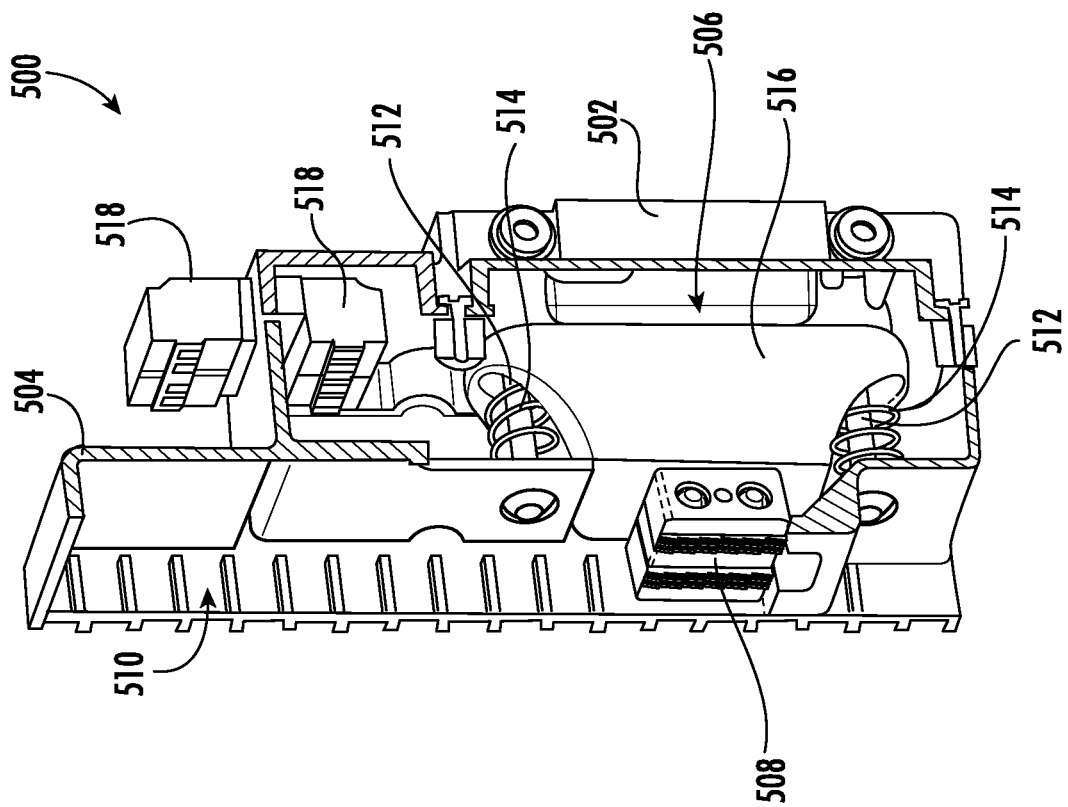
FIG. 5B is a partial cross-sectional illustration of the electromechanical actuator of FIG. 5A.
Figure 5A:
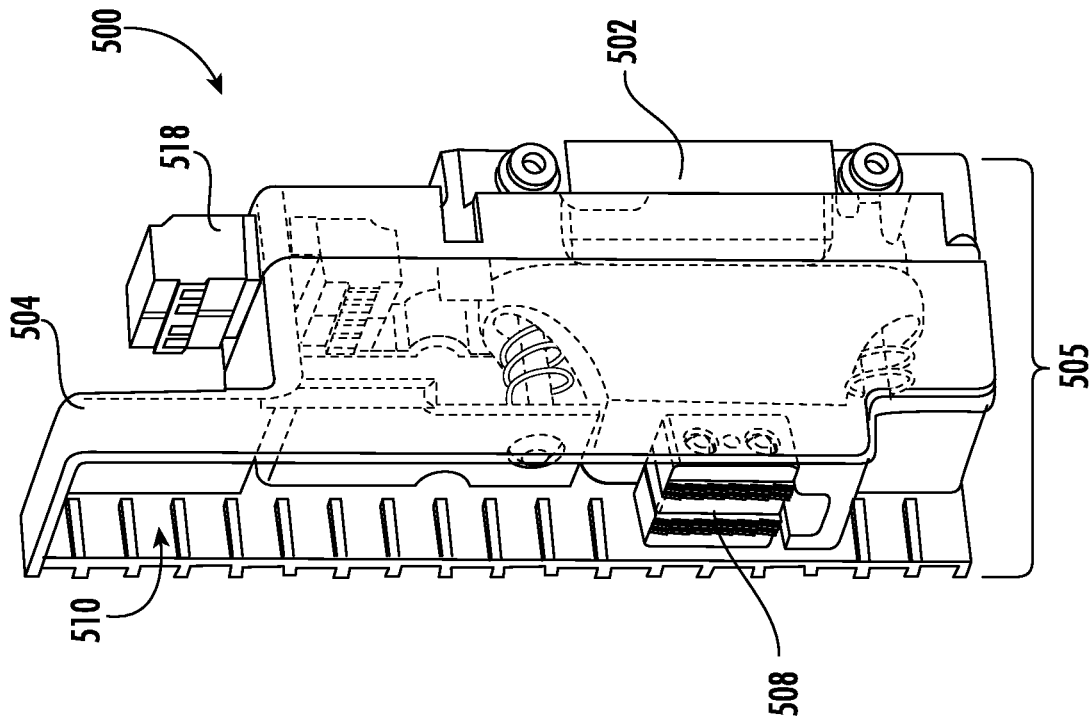
FIG. 5A is a schematic illustration of an electromechanical actuator that may incorporate embodiments of the present disclosure.

Turning now to FIGS. 5A-5B, schematic illustrations of an electromechanical actuator 500 that may incorporate embodiments of the present disclosure are shown. FIG. 5A illustrates an isometric illustration of the electromechanical actuator 500 and FIG. 5B is a partial cross-sectional view of the electromechanical actuator 500.

The electromechanical actuator 500 includes a first housing 502 and a second housing 504 that are fixedly connected together. Although shown, two separate housing components 502, 504 are configured to form a housing assembly 505. In alternative embodiments, the housing assembly 505 may be a single body, structure, or component that has substantially the same shape, structure, and configuration as the illustrative first and second housings 502, 504. The electromechanical actuator 500 further includes an electromagnet assembly 506 and a magnet assembly 508. As shown in FIG. 5B, the electromagnet assembly 506 may be housed between the first housing 502 and the second housing 504 and the magnet assembly 508 is housed within a track 510 defined by the second housing 504. In operation, the magnet assembly 508 may move along and within the track 510.

The electromagnet assembly 506 is a preformed structure that includes a coil and a core (e.g., laminated core, machined piece(s), etc.). Although shown and described as a laminated core, other core structures are possible without departing from the scope of the present disclosure. For example, in some embodiments, the core may be steel cores (e.g., formed from machined pieces) or ferrite cores. Advantageously, because the preformed structure is a unitary structure, the electromagnet assembly 506 does not include flanges and/or fasteners. The electromagnet assembly 506 may be moveably mounted within the housing 502, 504 along one or more guides 512 and be biased to a rest position by one or more biasing elements 514 along the guides 512. Additionally, lead wires electrically connected to the coil of the electromagnet assembly 506 may be securely retained or installed within the unitary structure. The electromagnet assembly 506 includes an encapsulating body 516 which contains the components of the electromagnet assembly 506. The encapsulating body 516 may be, for example, a preformed body, a cast body, a molded structure, or a potted structure that has the components of the electromagnet assembly 506 embedded therein (e.g., coil, laminated core, lead wire, etc.). In some embodiments, the encapsulating body 516 may be preformed and the components installed therein and in other embodiments, the encapsulating body 516 may be formed around the components. The lead wire may electrically connect to an electrical connector 518. The electrical connector 518 may be fixedly attached to or mounted to the first housing 502 and can provide for electrical connection between the electromagnet assembly 506 and an electrical source of the control system (e.g., as shown and described above).

The first housing 502 is configured to be mounted to or affixed to a portion of an elevator car, such as a frame. The second housing 504 is configured to be a portion of the structure that is moveable along (e.g., adjacent or relative to) a guide rail of an elevator system. That is, the second housing 504 defines a portion of the electromechanical actuator 500 that is adjacent to or proximate the guide rail. This results in the magnet assembly 508 being arranged and retained within the track 510 of the second housing 504 between material of the first and/or second housing 502, 504 and the guide rail. It will be appreciated that the second housing 504 preferably does not contact the guide rail. That is, although the elevator car and electromechanical actuator 500 may float away from the guide rail (e.g., relative movement/motion), the dimensions of the magnet assembly 508 are such that the magnet assembly 508 never leaves the track 510.

As shown in FIGS. 5A-5B, the electromagnet assembly 506 is an encapsulated component of the electromechanical actuator 500. However, as described herein, other components, such as the magnet assembly 508 may be alternatively or additionally encapsulated.

Figure 6:
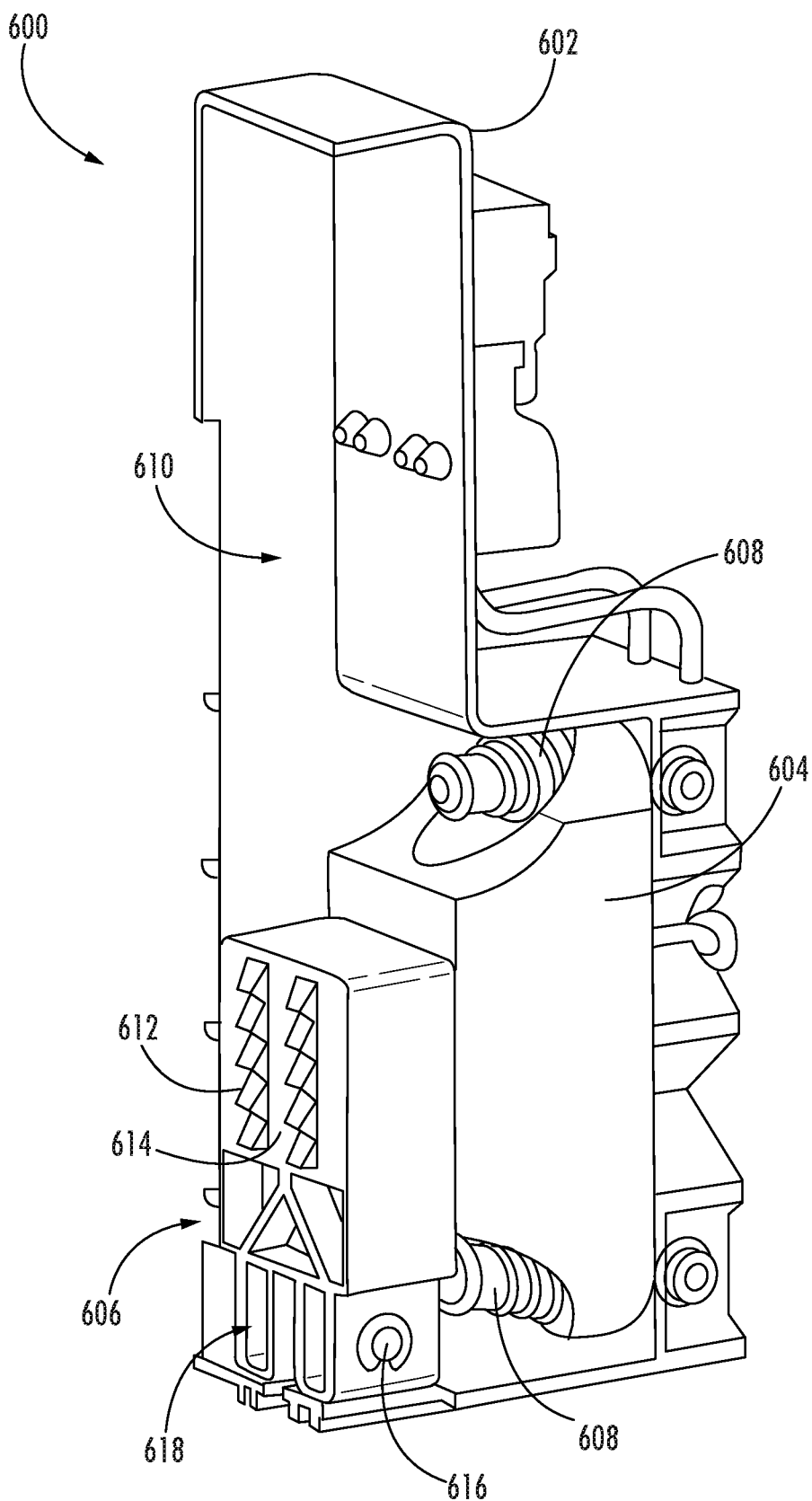
FIG. 6 is a schematic illustration of an electromechanical actuator that may incorporate embodiments of the present disclosure.

For example, turning now to FIG. 6, a schematic illustration of an electromechanical actuator 600 that may incorporate embodiments of the present disclosure is shown. The electromechanical actuator 600, as shown, includes a unitary formed housing 602 similar to that shown and described above (but in single-body form). The electromechanical actuator 600 includes an encapsulated electromagnet assembly 604 and an encapsulated magnet assembly 606. The encapsulated electromagnet assembly 604 is housed in a portion of the housing 602 and translatable or moveable along guides 608, similar to that described above. The encapsulated magnet assembly 606 is housed within a track 610 defined by a portion of the housing 602. In operation, the encapsulated magnet assembly 606 may move along and within the track 610.

Similar to the described encapsulated electromagnet assemblies described above, the components of the magnet assembly of the electromechanical actuator 600 are encased within a material to protect such components and improve part life. As shown, the encapsulated magnet assembly 606 includes an encapsulating body 612 that houses a magnet 614, which may include a toothed block. The encapsulating body 612 also houses a connector pin 616 that is configured to engage with a connecting rod to enable actuation of a safety brake when the encapsulated magnet assembly 606 moves upward along the track 610. The formation and structure of the encapsulated magnet assembly 606 may be substantially similar to that of the encapsulated electromagnet assemblies described above. That is, similar materials and/or manufacturing processes may be employed to form the encapsulated magnet assembly 606.

The connector pin 616 may be part of a component integrator 618 that allows for different locations/arrangements of connection to a connecting rod. Depending on a specific application and arrangement of parts (e.g., of the safety brake) some safeties lend themselves to lifting from the top of a wedge (e.g., most symmetric safeties) and others lend themselves to lifting from a face of a wedge (e.g., most asymmetric safeties). The preformed structure of the component integrator 618 permits different connection points to the connector pin 616, and thus enables greater versatility as compared to prior configurations.

Conventionally, the magnet assemblies included toothed blocks with machined teeth. Machining of such magnet blocks can be costly and require highly skilled or specialized tools. Further, such toothed blocks are subject to repeated operation and engagement with a guide rail, and thus wear can occur. Improved magnet blocks for electromechanical actuators may be desirable.

Embodiments of the present disclosure are directed to improved magnet blocks that may be used with electromechanical actuators of elevator systems. In accordance with embodiments of the present disclosure, alternative means for manufacturing and/or forming magnet blocks are provided that do not require intricate machining or costs associated therewith.

Figure 7A:
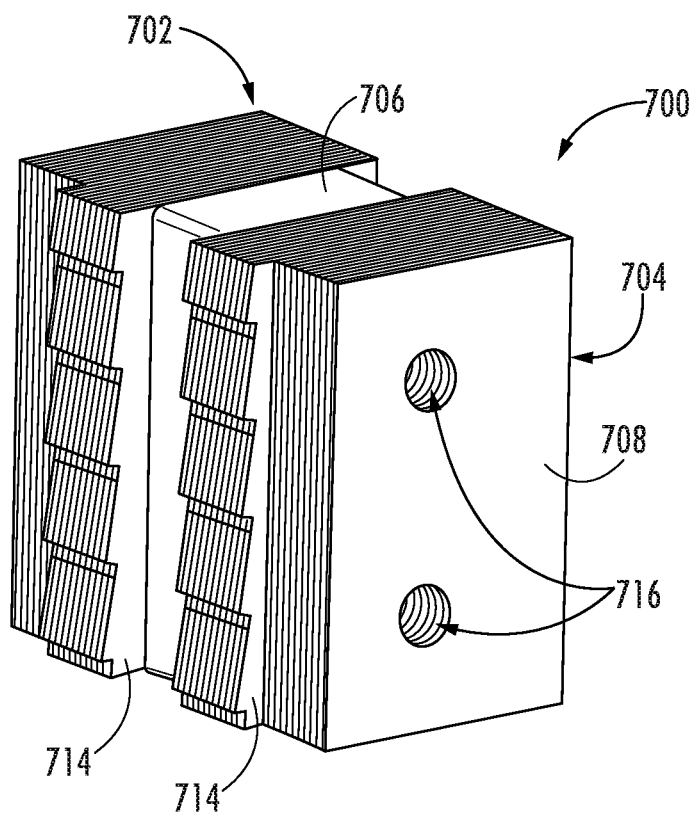
FIG. 7A is an isometric illustration of a magnet assembly in accordance with an embodiment of the present disclosure.
Figure 7B:
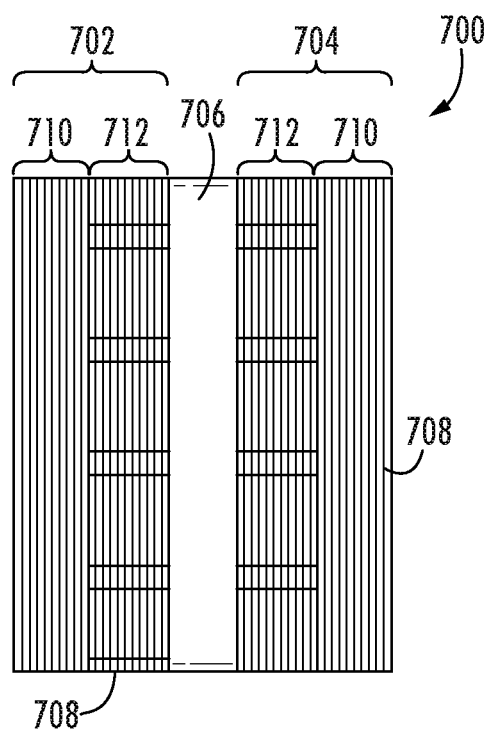
FIG. 7B is a front elevation schematic of the magnet assembly shown in FIG. 7A.

For example, turning to FIGS. 7A-7B, schematic illustrations of a magnet assembly 700 in accordance with an embodiment of the present disclosure are shown. The magnet assembly 700 may be used in encapsulated or non-encapsulated configurations, as shown and described above. The magnet assembly 700 includes two block assemblies 702, 704 arranged on opposite sides of a magnet 706. The magnet 706 may be a permanent magnet. The block assemblies 702, 704 are not machined assemblies, but rather are formed from a stack or group of joined sheet metal layers 708. That is, the block assemblies 702, 704 are laminated blocks or blocks formed of laminations, sheets, or layers of sheet metal.

A first group 710 of sheet metal layers 708 are generally rectangular and a second group 712 of sheet metal layers 708 include a friction engagement surface 714 in the form of blade teeth. In some embodiments, the block assembly 702, 704 may be formed from saw blade sheet metal stock (e.g., band saw stock). As such, the geometric profile of the first and second groups 710, 712 of sheet metal layers 708 may be formed through die cuts or punch-outs. The sheet metal layers 708 and the magnet 706 include apertures 716 that are aligned to receive fasteners, such as bolts, screws, rivets, etc. used to join the sheet metal layers 708 and the magnet 706 together to form the magnet assembly 700.

Figure 8A:
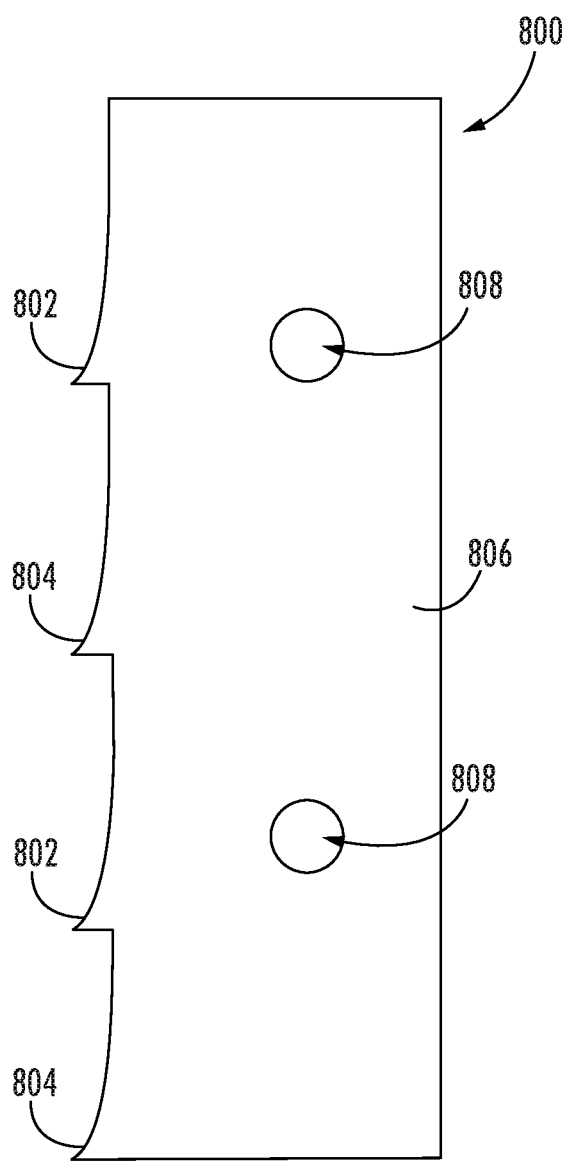
FIG. 8A is a side elevation view of a portion of a magnet assembly in accordance with an embodiment of the present disclosure.
Figure 8B:
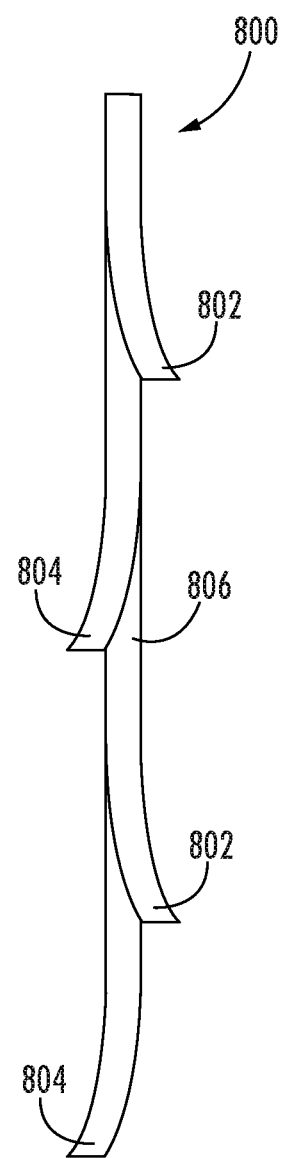
FIG. 8B is a from elevation view of the portion shown in FIG. 8A.

Turning now to FIGS. 8A-8B, schematic illustrations of a single layer of a sheet metal layer 800 for use in a magnet assembly in accordance with an embodiment of the present disclosure are shown. The sheet metal layer 800 includes a plurality of teeth 802, 804 which may be arranged in an alternating angled orientation or configuration, as illustrated, to form a friction engagement surface of a block assembly. That is, when assembled, a stack of sheet metal layers 800 may form a structure that include teeth that are alternating with respect to a body 806 of the sheet metal layer 800. The body 806 further includes apertures 808 configured to receive a fastener to enable joining of multiple sheet metal layers 800.

Advantageously, the material used to form such block assemblies may be significantly more cost effective than machining a toothed block from a single material block. In some embodiments, the saw blade sheet metal stock may be punched to form laminations that are then stacked together. After combining laminated blocks with a magnet, the assembly is riveted and then, may optionally be encapsulated. Advantageously, because the block assemblies are made from laminations of saw blade sheet metal stock, machining is no longer necessary. Further, heat treatment of the machined blocks can be eliminated because the saw blade sheet metal stock may already be hardened. In some embodiments, the addition of a coating for corrosion protection may not be necessary because of the saw blade sheet metal stock. That is, saw blade sheet metal stock with corrosion protection already applied may be employed.

Furthermore, because the magnet assembly is formed from laminated material in the form of sheet metal layers, eddy currents—which are created during actuation due to a changing magnetic field—will be dramatically reduced. The reduction of eddy currents ensures greater efficiency of the actuator that incorporates the magnets assemblies described above. Greater efficiency permits a reduction in the size of a trigger and/or reset capacitor or capacitors. Such reduced capacitors may enable further reductions in cost because the capacitors of such electromechanical actuators constitute a significant portion of the material cost of the system.

Figure 9A:
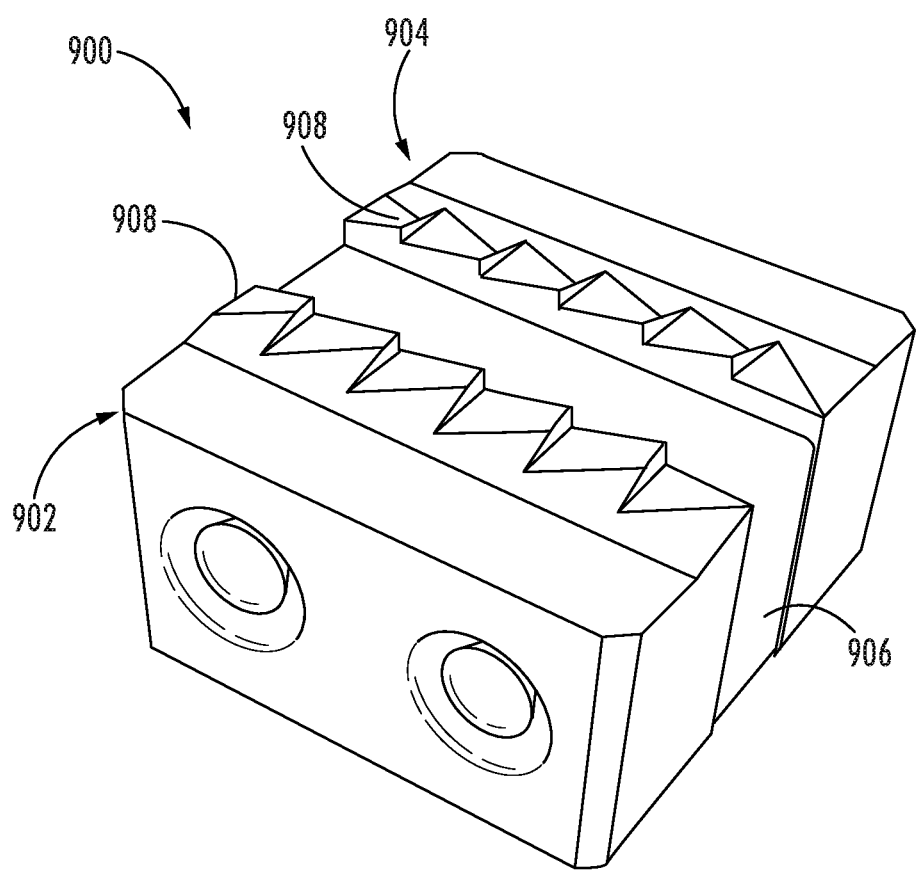
FIG. 9A is an isometric illustration of a magnet assembly in accordance with an embodiment of the present disclosure.
Figure 9B:
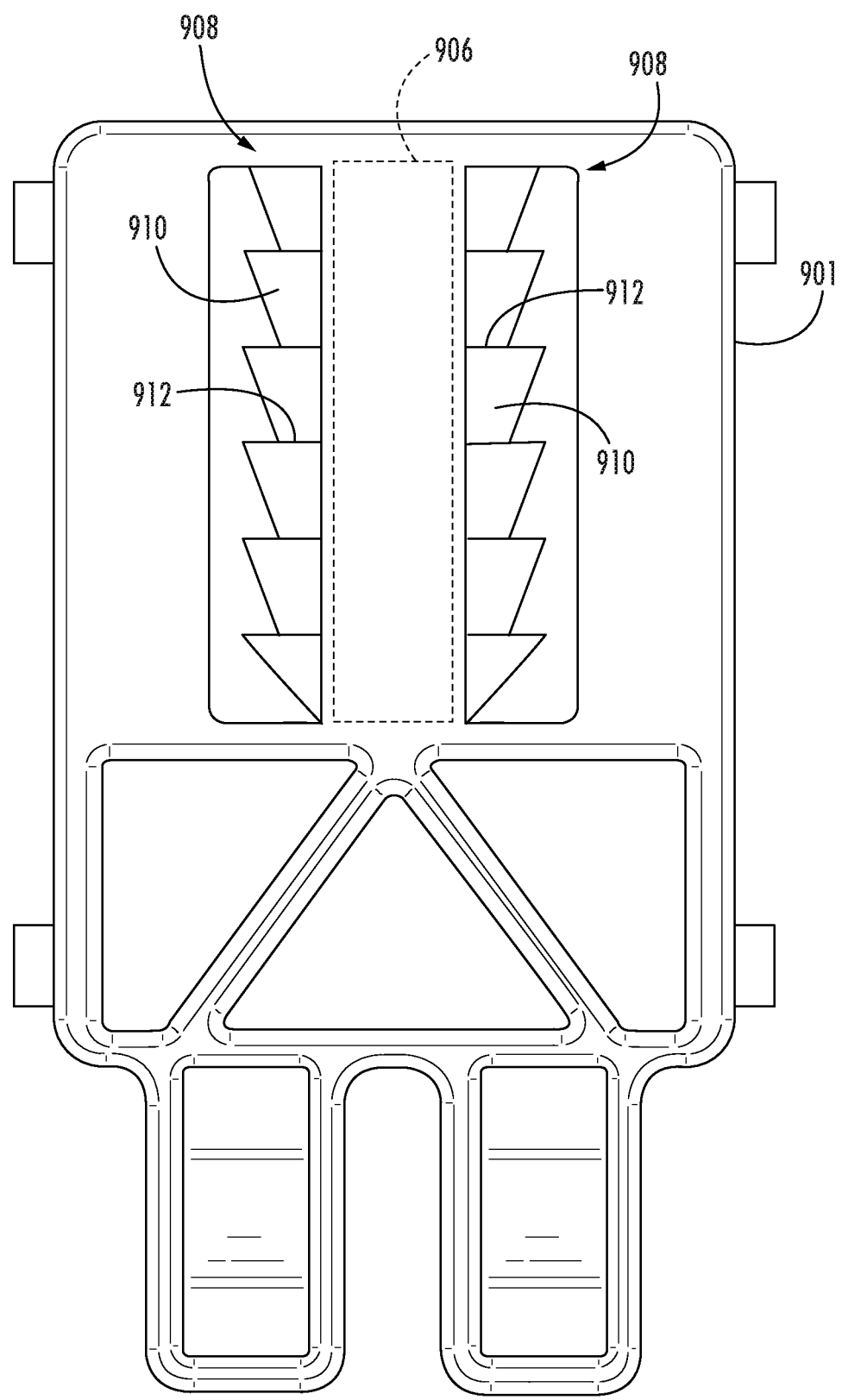
FIG. 9B is an elevation view of the magnet assembly of FIG. 9A as installed within an encapsulating body.

Turning now to FIGS. 9A-9B, schematic illustrations of a magnet assembly 900 in accordance with an embodiment of the present disclosure are shown. FIG. 9A illustrates magnet assembly 900 in isolation and FIG. 9B illustrates the magnet assembly 900 as installed within an encapsulating body 901. In this embodiment, the magnet assembly includes blocks that are formed using a powdered metal sintering process. The magnet assembly 900 includes a first block assembly 902, a second block assembly 904, and a magnet 906 secured between the first and second block assemblies 902, 904.

Each block assembly 902, 904 is formed from a powdered metal sintering process. In this process, powdered metal is used to fill a cavity (e.g., die) that is shaped like the formed magnet assembly block (i.e., the illustrated block assemblies 902, 904). The powdered metal is then compacted. The compacted powered metal is then ejected from the die and sintered in an oven. Sintering not only increases the material density but also hardens the material by causing the metal particles to fuse together. After sintering, a small amount of material on the teeth may be removed via a grinding process to sharpen the tips. Optionally, a corrosion protection layer is added (e.g., black oxide, nickel, etc.).

Due to the use of a die or preconfigured cavities used to preform the entire block assembly, each block assembly 902, 904 includes friction engagement surface 908. In this embodiment, the friction engagement surface 908 comprises a number of monolithic teeth arranged in a single column. Because of the use of a die to manufacture the block assemblies 902, 904, no machining is necessary to form the friction engagement surface 908. However, as noted above, in some embodiments, the friction engagement surface 908 may be sharpened after formation. In some embodiments, and as shown, the friction engagement surface 908 may each be monolithic in nature, rather than multi-toothed configurations. For example, in some conventional configurations, the teeth of a toothed block may be formed of columns of teeth on each side of the magnet (e.g., three columns on each side as shown in FIGS. 4A-4B). However, due to the manufacturing process of powdered metal sintering, the teeth of the magnet assembly 900 are monolithic with only a single column of teeth on each side of the magnet 906. As shown in FIG. 9B, the teeth of the friction engagement surface 908 are arranged as single column, with individual monolithic elements or teeth 910, with each monolithic element 910 having a tooth edge 912.

Advantageously, the powdered metal sintering magnet assemblies described herein can provide various improvements over conventional machining processes. For example, quality and quantity of manufactured components may be increased. The teeth are brought to final dimensions after heat treatment, rather than before heat treatment. After heat treatment, the teeth are resistant to damage by impacts. By contrast, machined blocks (e.g., under prior configurations) are brought to final dimensions before heat treatment. Given this, powdered metal sintered blocks present an advantage with respect to quality control (e.g., ensuring the final shape of the teeth).

Figure 10:
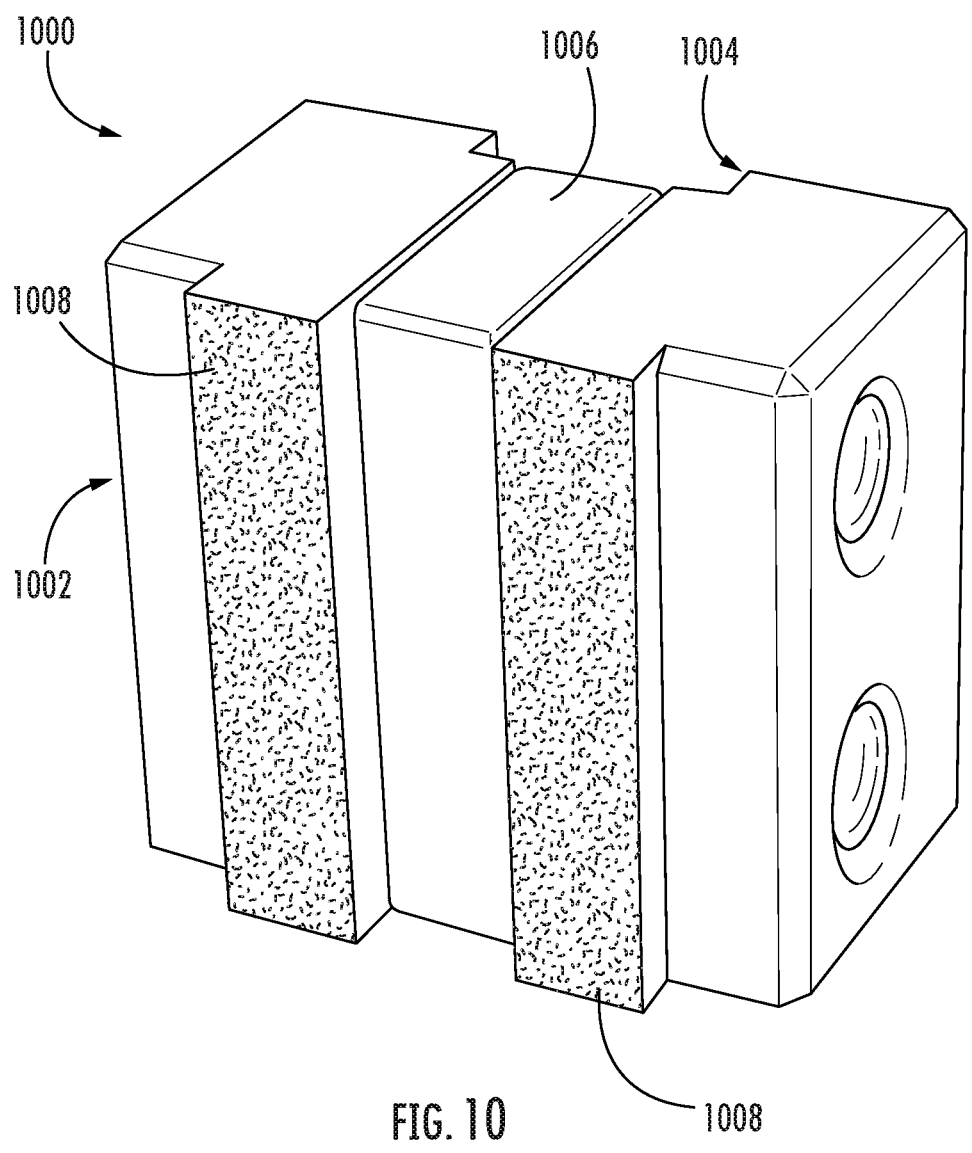
FIG. 10 is a schematic illustration of a magnet assembly in accordance with an embodiment of the present disclosure.

Turning now to FIG. 10, a schematic illustration of a magnet assembly 1000 in accordance with an embodiment of the present disclosure is shown. In this embodiment, the magnet assembly includes blocks that are formed without teeth. The magnet assembly 1000 includes a first block assembly 1002, a second block assembly 1004, and a magnet 1006 secured between the first and second block assemblies 1002, 1004. The block assemblies 1002, 1004 may be manufactured by machining, molds, powder metal sintering, or by other processes. In this embodiment, the block assemblies merely have the form of the blocks but no formed teeth.

In contrast, in this embodiment, the block assemblies 1002, 1004 include a friction engagement surface 1008 in the form of an abrasive coating applied to the block assemblies 1002, 1004. In some embodiments, the blocks may be fabricated from low carbon steel to maximize magnetic permeability of the blocks. Subsequently, the blocks and the magnet 1006 may be assembled as shown, and then encapsulated within a housing (e.g., as shown in FIG. 6). A super abrasive coating is then applied only to the exposed steel surfaces of the blocks. The super abrasive could be one of many types, including, without limitation, Cubic Boron Nitride ("CBN") or industrial diamond.

The friction engagement surface 1008 provides for a contact surface between the block assemblies 1002, 1004 and a guide rail. The friction engagement surface 1008 provides for gripping engagement to generate braking force and thus stop the movement of an elevator car.

Because the blocks of the present embodiment no longer have teeth, a greater number of types of steels are available for the formation of the blocks. That is, the material of the block is no longer the material that provides the contact and engagement surface with a guide rail, but rather it is the friction engagement surface 1008 that provides such contact. Because of this, heat treatment of the blocks can be eliminated. Moreover, the addition of a coating for corrosion protection may no longer be necessary because the friction engagement surface 1008 fulfills this function.

In some embodiments, by encapsulating the magnet assembly prior to the addition of the friction engagement surface 1008 (e.g., as shown in FIG. 6), the cost of the manufacturing process may be reduced. By coating the blocks with the abrasive coating 1008 after encapsulation, no masking is needed. As such, the entire exposed friction interface—which is small in surface area—can be coated economically.

Accordingly, in accordance with embodiments of the present disclosure, electromechanical systems may incorporate one or more improved magnet assemblies, as shown and described above. Advantageously, embodiments of the present disclosure enable increased electromechanical actuator component product life as compared to prior configurations, and specifically improved magnet assemblies thereof. The magnet assemblies of the present disclosure provided for reduced costs while improving component life. The blocks that support a magnet and are configured to engage with a guide rail of an elevator system are improved, as described above. Variations on the contact configurations is improved, such as through improved tooth configurations and/or through the use of an abrasive coating.

The terminology used herein is for the purpose of describing particular embodiments only and is not intended to be limiting of the present disclosure. The terms "about" and "substantially" are intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of making a magnet assembly of an electromechanical assembly for an elevator system, the method comprising:
   stacking a first plurality of sheet metal layers to form a first block assembly, wherein a portion of the first block assembly includes a plurality of blade teeth that define a first friction engagement surface of the first block assembly;
   stacking a second plurality of sheet metal layers to form a second block assembly, wherein a portion of the second block assembly includes a plurality of blade teeth that define a second friction engagement surface of the second block assembly;
   arranging the first block assembly on a first side of a magnet; and
   arranging the second block assembly on a second side of the magnet opposite the first block assembly, and
   wherein the first friction engagement surface and the second fiction engagement surface are configured to engage with an elevator guide rail.

2. The method of claim 1, wherein the layers of sheet metal of at least the first block assembly include a first group of sheet metal layers that are generally rectangular and a second group of sheet metal layers that include teeth that form the plurality of blade teeth.

3. The method of claim 1, wherein the layers of sheet metal and the magnet include at least one aperture for receiving at least one respective fastener to join the layers of sheet metal and the magnet together, the method further comprising securing the magnet between the first block assembly and the second block assembly with a fastener through the at least one aperture.

4. The method of claim 1, wherein the portion of the first block assembly that includes a plurality of blade teeth are layers of sheet metal that are saw blade sheet metal stock.

5. The method of claim 1, further comprising encapsulating the magnet, the first block assembly, and the second block assembly within an encapsulating body.

6. The method of claim 5, wherein the encapsulating body is formed of a non-magnetic material.

7. The method of claim 1, wherein the portion of the first block assembly that includes a plurality of blade teeth comprises layers of sheet metal include alternating angled teeth that form the blade teeth, wherein angles of the alternating angled teeth alternate between angled toward the first block assembly and angled toward the second block assembly.

8. The method of claim 1, wherein the magnet, the first block assembly, and the second block assembly are configured to engage with the elevator guide rail and act upon a connecting rod to actuate a safety brake.

9. The method of claim 1, further comprising installing the magnet assembly within an electromechanical assembly, wherein the magnet, the first block assembly, and the second block assembly are configured to travel within a track of the electromechanical assembly.

10. A method of making a magnet assembly of an electromechanical assembly for an elevator system, the method comprising:
    forming a first block assembly from powder metal sintering, the first block assembly having a first plurality of monolithic teeth defining a first friction engagement surface;
    forming a second block assembly from powder metal sintering, the second block assembly having a second plurality of monolithic teeth defining a second friction engagement surface;
    arranging the first block assembly on a first side of a magnet; and
    arranging the second block assembly on a second side of the magnet opposite the first block assembly,
    wherein the first friction engagement surface and the second friction engagement surface are configured to engage with an elevator guide rail.

11. The method of claim 10, further comprising encapsulating the magnet, the first block assembly, and the second block assembly within an encapsulating body.

12. The method of claim 11, wherein the encapsulating body is formed of a non-magnetic material.

13. The method of claim 10, wherein the magnet, the first block assembly, and the second block assembly are configured to engage with the elevator guide rail and act upon a connecting rod to actuate a safety brake.

14. The method of claim 10, further comprising installing the magnet assembly within an electromechanical assembly, wherein the magnet, the first block assembly, and the second block assembly are configured to travel within a track of the electromechanical assembly.

15. A method of making magnet assembly of an electromechanical assembly for an elevator system, the method comprising:
    applying a first abrasive coating to a first block assembly, wherein the first abrasive coating defines a first friction engagement surface; and
    applying a second abrasive coating to a second block assembly, wherein the second abrasive coating defines a second friction engagement surface;
    arranging the first block assembly on a first side of a magnet; and
    arranging the second block assembly on a second side of the magnet opposite the first block assembly, wherein the first friction engagement surface and the second friction engagement surface are configured to engage with an elevator guide rail.

16. The method of claim 15, wherein the abrasive coating comprises at least one of Cubic Boron Nitride ("CBN") and industrial diamond.

17. The method of claim 15, further comprising encapsulating the magnet, the first block assembly, and the second block assembly within an encapsulating body.

18. The method of claim 15, wherein the encapsulating body is formed of a non-magnetic material.

19. The method of claim 15, wherein the magnet, the first block assembly, and the second block assembly are configured to engage with the elevator guide rail and act upon a connecting rod to actuate a safety brake.

20. The method of claim 15, further comprising installing the magnet assembly within an electromechanical assembly, wherein the magnet, the first block assembly, and the second block assembly are configured to travel within a track of the electromechanical assembly.

\* \* \* \* \*